Figure 1:
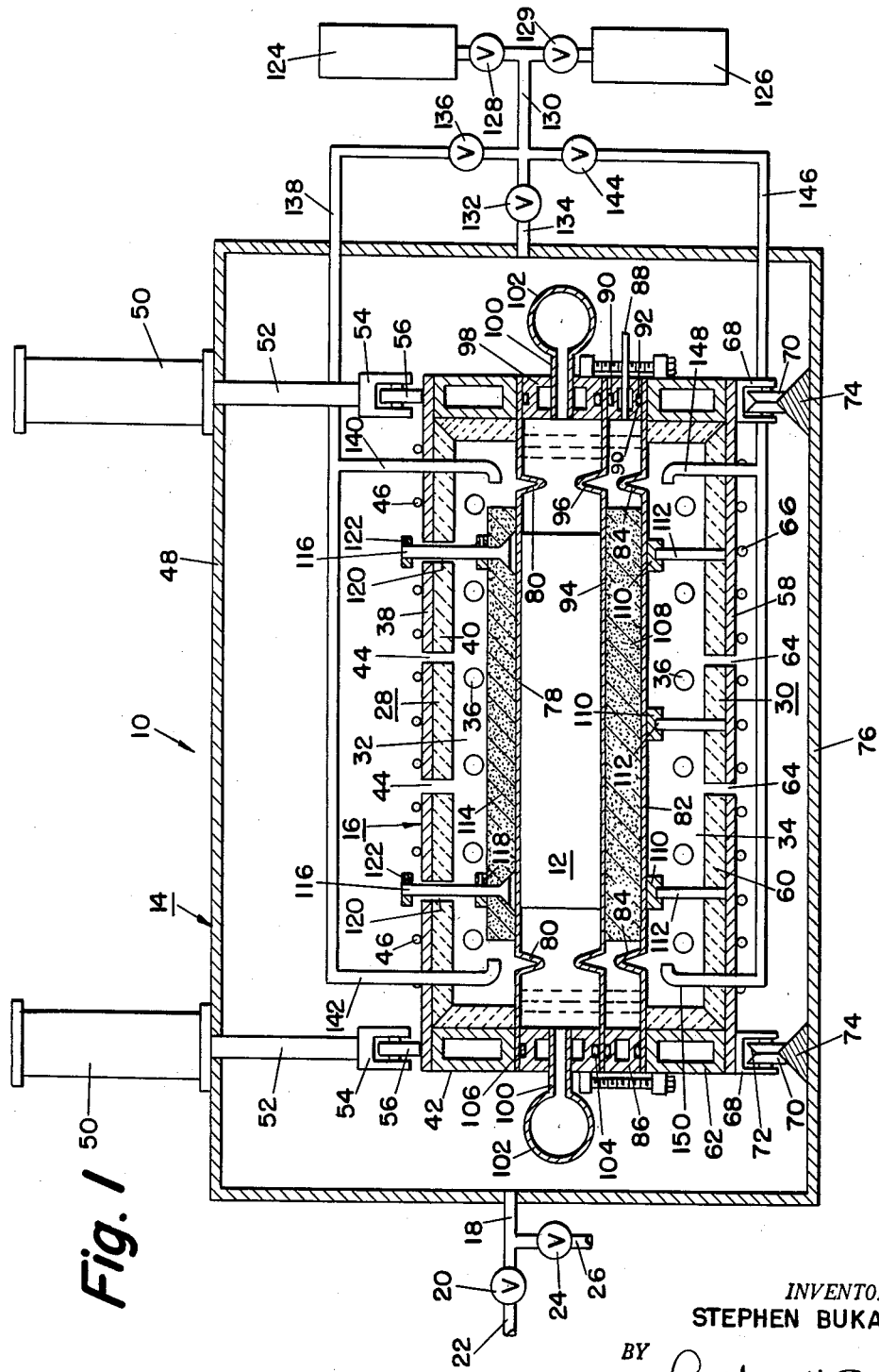

Nov. 13, 1962     S. BUKATA     3,064,118

FURNACE

Filed July 31, 1959

INVENTOR.
STEPHEN BUKATA

BY Arthur H. Seidel

ATTORNEY

3,064,118
FURNACE
Stephen Bukata, 7813 Ardleigh St., Philadelphia, Pa.
Filed July 31, 1959, Ser. No. 830,935
13 Claims. (Cl. 219—85)

The present invention is directed to a furnace and more particularly to a furnace for brazing sandwich panels comprising a honeycomb or like core disposed intermediate cover sheets.

The need for structural materials which have high strength-to-weight ratios and remain structurally sound at elevated temperatures has resulted in a concentrated effort to develop stainless steel, or titanium or like metal sandwich structures. Such sandwich structures have excellent fatigue characteristics under extreme conditions of heat, vibration, and sound, so that they comprise preferred constructional materials for high speed aircraft and missiles.

Unfortunately, the cost of manufacture of sandwich structures by conventional techniques is very great. At the present time, many forms of sandwich panels have a cost of a thousand dollars per cubic foot and more.

An appreciable part of the cost of sandwich structures lies in the cost of brazing the core to the cover sheets and to the edge members. Particularly is this the case where the metallurgical considerations effecting the braze require that the brazing be done under vacuum conditions, or in a selected closely controlled atmosphere, such as an atmosphere comprising an inert gas. At the present time, brazing operations of the aforesaid type are effected using welded envelopes which are expensive to construct, and which must be cut open to effect removal of the sandwich structure.

In addition, it has been found that after a panel of the sandwich structure has been brazed, it is necessary to subject the panel to a heat-treat procedure to develop maximum strength in the panel. The heat-treat process requires rapid cooling of the panel and also subsequent sub-zero cooling of the panel. Generally, this cooling has been accomplished by removing the envelope containing the panel and inserting the entire unit into a refrigerated enclosure. After cooling, the entire unit is again put back into the brazing furnace for further heat treatment. This transferring of the envelope back and forth between the furnace and the refrigerated enclosure is not only time consuming so as to add to the cost of the sandwich structure, but can also cause the sandwich structure to be damaged during handling.

It is an object of the present invention to provide a new furnace.

It is another object of the present invention to provide a furnace for brazing sandwich assemblies.

It is still another object of the present invention to provide a furnace in which brazing may be effected under closely controlled atmospheric conditions including high vacuum conditions.

It is a further object of the present invention to provide a furnace for brazing sandwich assemblies in which the sandwich assemblies can be subjected to a heat-treat process without being removed from the furnace.

Other objects will appear hereinafter.

For the purpose of illustrating the invention there is shown in the drawings a form which is presently preferred; it being understood, however, that this invention is not limited to the precise arrangements and instrumentalities shown.

The FIGURE is a sectional view of the furnace of the present invention.

Referring to the drawing, the furnace of the present invention is generally designated as 10. Furnace 10 is a brazing furnace for brazing sandwich structures designated generally as 12. Such sandwich structures 12 include a core, which may comprise a honeycomb core, waffle core, or other suitable core structures. The core is to be brazed by thin leaves of braze metal between cover sheets and channel-shaped edge members as is well known in the art.

The furnace 10 comprises a housing 14, and a retort portion, generally designated as 16, mounted within the housing 14. The housing 14 is an imperforate shell which is open at only one end, not shown. A door, not shown, extends across the open end of the housing 14, and the door is sealed to the housing 14 by a gas-tight seal. Housing 14 is provided with a port 18. Port 18 is connected through valves 20 and pipe 22 to a pressure control means, such as a vacuum pump or an air pressure pump. Port 18 is connected through valve 24 and pipe 26 to the atmosphere. Thus, the casing 14 can be opened to atmospheric pressure, or can be placed under sub-atmospheric pressures, or can be raised to pressures higher than atmospheric.

The retort portion 16 of the furnace 10 includes an oven top 28 and an oven bottom 30. Oven top 28 and oven bottom 30 comprise integral members, preferably formed from ceramic or other analagous kiln or furnace materials having similar high temperature characteristics. Oven top 28 and oven bottom 30 may comprise identical members formed as singular trays. Thus, the end walls 32 of oven top 28 and the end walls 34 of oven bottom 30 provide support for the electric heating elements 36 which raise the temperature within the furnace 10 to a suitable level to effect brazing (a temperature above the melting point for solidus and liquidus temperature of the braze metal used). The electric heating elements 36 may comprise similar heating elements shaped in the form of elongated cylinders. I have found that silicon carbide cylindrical heating elements are most suitable for use in the furnace of the present invention. However other types of heating elements can be used, such as induction heaters, resistance wire heating elements, or quartz lamps. In the illustrated embodiment, five electric heating elements 36 are illustrated. However, it is to be understood that a greater or smaller number of heating elements 36 may be provided.

A metal plate 38 is secured across the outer surface of the top wall 40 of the oven top 28. The metal plate 38 projects beyond the edges of the top wall 40. A top closure member 42 extends entirely around the oven top 28, and is secured to the bottom surface of the plate 38. Top closure members 42 have a hollow interior which may be used as a water jacket, or jacket for other liquid or gas coolant. The top wall 40 of the oven top 28 and the plate 38 have a plurality of holes 44 therethrough through which holes 44 the interior of the oven top 28 is in communication with the interior of the housing 14. Water cooled copper tubes 46 extend across the outer surface of the plate 38, and are secured to the plate 38 such as by soldering.

The assembly of the oven top 28, the plate 38, and the top closure member 42 is supported from the top wall 48 of the housing 14 by hydraulic cylinders 50. The hydraulic cylinders 50 are seated on the top wall 48 of the housing 14, and the piston rods 52 extend downwardly from the hydraulic cylinders 50 through the top wall 48 to the plate 38. Each of the piston rods 52 has a clevis 54 at its bottom end. The clevises 54 extend around and are pivotally connected to tongues 56 which are secured to the top surface of the plate 38. By operating the hydraulic cylinders 50, the assembly of the oven top 28, plate 38, and top closure member 42 can be raised or lowered.

A metal plate 58 is secured across the outer surface of the bottom wall 60 of the oven bottom 30. Plate 58 projects beyond the edges of the bottom wall 60 of the oven bottom 30. A bottom closure member 62 extends completely around the bottom oven 30, and is secured to the top surface of the plate 58. Bottom closure member 62 has a hollow interior which may be used as a water jacket, or jacket for other liquid or gas coolant. The bottom wall 60 of oven bottom 30 and the plate 58 have a plurality of holes 64 therethrough through which holes 64 the interior of the oven bottom 30 is in communication with the interior of the housing 14. Water cooled copper tubes 66 extend across and are secured to the bottom surface of the plate 58.

U-shaped brackets 68 are secured to the bottom surface of the plate 58 along the sides of the plate 58. The arms of the brackets 68 extend downwardly from the plate 58, and a separate wheel 70 is rotatably supported between the arms of each of the brackets 68. Each of the wheels 70 has a V-shaped groove 72 in its outer periphery, and the wheels 70 ride on V-shaped tracks 74. The tracks 74 extend along the floor 76 of the housing 14 to the open end of the housing 14. Thus, the assembly of the oven bottom 30, the plate 58, and the bottom closure member 62 is supported on the tracks 74 so that the assembly can be rolled out of, and back into the housing 14.

A top envelope sheet or closure sheet 78 formed of metal having a high melting point is provided beneath oven top 28. Top envelope sheet 78 projects beyond the oven top 28 and extends beneath the top closure member 42. The top envelope sheet 78 may comprise a flat member, but preferably includes accommodation corrugation 80 for compensating from a thermal expansion and reduction. Such accommodation corrugation 80 is positioned on the envelope sheet 78 adjacent to but within the walls of the oven top 28. A bottom envelope sheet 82 is provided above oven bottom 30. Bottom envelope sheet 82 projects beyond the oven bottom 30, and across the bottom closure member 62. Bottom envelope sheet 82 is of a similar construction to that of the top envelope sheet 78, and includes an accommodation corrugation 84.

An intermediate closure member 86 is seated on the top surface of the bottom envelope sheet 82 directly above the bottom closure member 62. The intermediate closure member 86, like the bottom closure member 62, extends completely around the oven bottom 30. The intermediate closure member 86 is provided with a hollow interior through which water or other coolant may be passed. A pipe 88 extends through the intermediate closure member 86 from the inner surface of the intermediate closure member 86. The pipe 88 is connected to an exhaust means, such as a vacuum pump.

The uppermost face and the bottommost face of the intermediate closure member 86 are each provided with a gasket receiving notch 90 which extends about the entire face of the intermediate closure member 86. A separate closed, continuous gasket 92 such as an O-ring, is within each of the notches 90. The O-ring 92 in the bottommost face of the intermediate closure member 86 engages the top surface of the bottom envelope sheet 82, and provides a gas-tight seal between the bottom envelope sheet 82 and the intermediate closure member 86.

An intermediate envelope sheet 94 extends across the oven bottom 30 between the top envelope sheet 78 and the bottom envelope sheet 82. Intermediate support sheet 94 extends across and is seated on the uppermost surface of the intermediate closure member 86. Intermediate support sheet 94 is of a similar construction to that of the top envelope sheet 78 and the bottom envelope sheet 82, and includes an accommodation corrugation 96. The O-ring 92 in the uppermost surface of the intermediate closure member 86 engages the bottom surface of the intermediate envelope sheet 94 to provide a gas-tight seal between the intermediate envelope sheet 94 and the intermediate closure member 86.

A middle closure member 98 is disposed intermediate the top envelope sheet 78 and the intermediate envelope sheet 94. Middle closure member 98 is positioned directly between the top closure member 42 and the intermediate closure member 86. The middle closure member 98 is provided with a hollow interior through which water or other liquid or gas coolant may be passed. Ducts 100 extend through the middle closure member 98 from the inner surface of the middle closure member 98. Ducts 100 are connected by pipes 102 to an exhaust means, such as a vacuum pump. The uppermost and bottommost faces of the middle closure member 98 are each provided with a gasket receiving notch 104 which extends about the entire face of the middle closure member 98. A separate closed, continuous gasket 106, such as an O-ring, is within each of the notches 104. The O-rings 106 engage the top envelope sheet 78 and intermediate envelope sheet 94 to provide a gas-tight seal for the portion of the furnace 10 between the top envelope sheet 78 and the intermediate envelope sheet 94.

A base or slab 108 of graphite, ceramic or other suitable material for uniformally dissipating the heat from electric heating elements 36 is provided between the bottom envelope sheet 82 and the intermediate envelope sheet 94. Base 108 supports the sandwich structure 12, and at the brazing temperature the sandwich structure 12 will assume the shape of the reference base 108. To support the weight of the base or slab 108, a plurality of ceramic rails 110 extend beneath the bottom envelope sheet 82. The rails 110 are mounted on upright supports 112 which are secured to the bottom plate 58 of the oven bottom 30. A slab 114 of graphite, ceramic or other suitable material for uniformally dissipating the heat from the electric heating elements 36 is provided on top of the top envelope sheet 78. A pair of headed guide rods 116 extend upwardly through the slab 114 with the heads of the guide rods 116 being recessed in the bottom surface of the slab 114. A separate nut 118 is threaded on each of the guide rods 116 and is seated on the top surface of the slab 114 to secure the guide rods 116 to the slab 114. The guide rods 116 extend upwardly through aligned holes 120 in the top wall 40 of the oven top 28 and the plate 38. A separate nut 122 is threaded on the top end of each of the guide rods 116 to limit the downward movement of the slab 114 with respect to the oven top 28.

To cool the furnace 10, a pair of containers 124 and 126 containing a coolant material are connected through valves 128 and 129 respectively to a pipe 130. Pipe 130 is connected to the interior of the housing 14 through a valve 132 and a pipe 134. Pipe 130 is connected to the interior of the oven top 28 through a valve 136, and pipes 138, 140, and 142. Pipe 130 is also connected to the interior of the oven bottom 30 through a valve 144, and pipes 146, 148, and 150. Each of the pipes 140, 142, 148, and 150 is provided with a spray nozzle in its end within the oven top 28 or oven bottom 30. The container 124 may contain carbon dioxide in liquid form, and the container 126 may contain carbon dioxide in gaseous form.

The operation of the furnace 10 of the present invention is as follows:

In order to insert the components forming the sandwich structure 12 and the leaves of braze metal, the oven top 28 is lifted from the top envelope sheet 78 by means of hydraulic cylinders 50. This also raises the graphite slab 114 from the top envelope sheet 78. The door of the housing 14 is opened, and the oven bottom 30 with the intermediate closure member 86 and the middle closure member 98 is wheeled out of the housing 14 on the rails 74.

When the oven bottom 30 is in its exposed disposition, the top envelope sheet 78 is lifted from the middle closure member 98. The components of the sandwich structure 12 and the braze metal leaves may then be operatively inserted in position on the intermediate envelope sheet 94. The top envelope sheet 78 may then be repositioned on the middle closure member 98, and the oven bottom 30 wheeled back into the housing 14 to a position beneath the oven top 28. The oven top 28 is then lowered until the top closure member 42 and the graphite slab 114 are seated on the top envelope sheet 78.

When the retort portion 16 of the furnace 10 is fully assembled, the door of the housing 14 is closed and sealed tightly to the housing 14.

The housing 14, and the oven top 28 and the oven bottom 30 can then be exhausted. The exhaustion of the housing 14 is effected through the port 18 by opening the valve 20 so that the interior of the housing 14 is in communication with the exhaust means through the pipe 22. Exhaustion of the oven top 28 is effected through the holes 44, and exhaustion of the oven bottom 30 is effected through the holes 64. Thus, the exhaustion of the interior of the housing 14 also exhausts the interior of the oven top 28 and the oven bottom 30 to the same pressure.

The space within the middle closure member 98 and between the top envelope sheet 78 and the intermediate envelope sheet 94 is exhausted through the exhaust ducts 100 and the pipes 102. The space within the intermediate closure member 86 and between the bottom envelope sheet 82 and the intermediate envelope sheet 94 is exhausted through the pipe 88. The spaces within the middle closure member 98 and the intermediate closure member 86 are exhausted to lower pressures than the pressure within the oven top 28 and the oven bottom 30. The higher pressure above the top envelope sheet 78 and below the bottom envelope sheet 82 presses the sandwich construction 12 firmly against the graphite slab 108. By having the pressure within the oven top 28 and the oven bottom 30 below atmospheric pressure, the pressure differential across the top envelope sheet 78 and the bottom envelope sheet 82 can be easily controlled to maintain intimate contact between the sandwich construction 12 and the graphite slab 108, but not sufficiently great to crush the sandwich construction 12.

With the pressures within the furnace 10 being maintained to provide intimate contact between the sandwich construction 12 and the graphite slab 108, the heaters 36 are turned on to heat the retort portion 16, and thereby braze together the components forming the sandwich structure 12. It is to be noted that the heating elements 36 may be provided with individual switches to permit but a small number of such heating elements 36 to be used in the case of very narrow sandwich structures thereby effecting material savings and expenditures for electrical power.

The flow of liquid or gas coolant through the top closure member 42, bottom closure member 62, intermediate closure member 86, and middle closure member 98 may be used to cool the peripheral portions of the envelope sheets 78, 82, and 94 and prevent heat-damage to the O-rings 92 and 106. However, the O-rings 92 and 106 are preferably formed of material which is not adversely affected by the temperatures encountered in the peripheral portions of the envelope sheets 78, 82 and 94.

The accommodations corrugations 80, 84, and 96 take up the thermal expansion encountered during the brazing operation, and take up the contraction encountered after the high temperature phase of the brazing operation has been completed.

After the sandwich construction 12 has been brazed, it is desirable to subject the sandwich construction 12 to a heat-treat procedure to develop maximum strength in the sandwich construction 12. The heat-treat process requires rapid cooling of the sandwich construction 12, and also subsequent sub-zero cooling of the sandwich construction 12. To rapidly cool the sandwich construction 12, the coolant gas from the container 126 is admitted into the housing 14 by opening the valves 129, 136, and 144. After the sandwich construction 12 is cooled by the coolant gas from the container 126, the liquid coolant from the container 124 is admitted into the oven top 28 and oven bottom 30 through the pipes 140, 142, 148, and 150. As the liquid coolant passes through the nozzles in the ends of the pipes 140, 142, 148, and 150, the liquid coolant expands and effects rapid cooling of the sandwich construction 12 to sub-zero temperatures.

After the sandwich construction 12 has been properly cooled, the sandwich construction 12 can be reheated by means of the heaters 36 to continue the heat-treat process. Thus, the sandwich construction 12 may be cooled and reheated as many times as necessary to provide the desired heat-treat without removing the sandwich construction 12 from the furnace 10.

The furnace construction 10 of the present invention permits brazing to be done under closely controlled conditions without the necessity of resorting to sealed envelopes. Thus, the furnace of the present invention enables panels comprising sandwich structures to be brazed far more rapidly and cheaply than was possible by the use of means heretofore used for that purpose.

The present invention may be embodied in other specific forms without departing from the spirit or essential attributes thereof and, accordingly, reference should be made to the appended claims, rather than to the foregoing specification as indicating the scope of the invention.

I claim:

1. A brazing furnace comprising a bottom oven section, a top oven section superimposed over said bottom oven section, said sections being separate and spaced from one another, three imperforate superimposed envelope sheets disposed in spaced horizontal planes intermediate said top and bottom oven sections, a first closure member intermediate the bottommost sheet and the intermediate sheet adjacent the peripheries thereof, a second closure member between the topmost sheet and the intermediate sheet adjacent the peripheries thereof, heating means supported between the top and bottom oven sections, said heating means being adjacent to one of said topmost and bottommost sheets for heating the space between the topmost and intermediate sheets, means for evacuating the space between the topmost and intermediate sheets, and sealing means between each of said closure members and its adjacent envelope sheet, whereby said closure members, top oven section and bottom oven section form an oven with the periphery of said sheets outside of the heat zone which is the interior of said oven, a housing disposed about said separable top and bottom oven sections, means in communication with the interior of said housing for evacuating said housing, and openings through each of said top and bottom oven sections providing communication between the interior of said housing and the interior of said top and bottom oven sections for evacuating the space above the topmost envelope sheet and below the bottommost envelope sheet.

2. A furnace in accordance with claim 1 including means supporting said top oven section from the housing for selective movement of said top oven section toward and away from said bottom oven section so that articles to be heated may be placed on said intermediate sheet after the removal of said topmost sheet.

3. A furnace in accordance with claim 2 in which the means for supporting said top oven section comprises hydraulic cylinders mounted on said housing above said top oven section, and a piston rod extending downwardly from each of said hydraulic cylinders and connected to said top oven section.

4. A furnace in accordance with claim 2 including means movably supporting said bottom oven section for movement out of and into said housing.

5. A furnace in accordance with claim 1 including means in communication with said housing and said top and bottom oven sections for cooling said furnace.

6. In a furnace comprising two spaced envelope sheets sealed at their periphery and defining a sandwich receiving section between said sheets, one of said sheets being flexible, exhaust means selectively connected to said sandwich receiving section for reducing the pressure therein below the pressure above said one flexible sheet, whereby the pressure above said one flexible sheet is adapted to maintain a sandwich construction between said sheets in intimate contact therewith, means selectively providing for relative movement between said sheets so that a to-be-brazed sandwich may be positioned between said sheets, selectively operable means for heating said section, and conduit means supported within a chamber above said section and partially defined by said selectively operable means, said conduit means terminating in a nozzle for directing coolant gas into said chamber for cooling said one sheet, so as to effect rapid cooling of a sandwich construction adapted to be mounted between said sheets.

7. A brazing furnace comprising a bottom oven section, a top oven section superimposed over said bottom oven section, said sections being separate and spaced from one another, three imperforate superimposed envelope sheets disposed in spaced horidontal planes intermediate said top and bottom oven sections, a first closure member intermediate the bottommost sheet and the intermediate sheet adjacent the peripheries thereof, a second closure member between the topmost sheet and the intermediate sheet adjacent the peripheries thereof, heating means supported between the top and bottom oven sections, said heating means being adjacent to one of said topmost and bottommost sheets for heating the space between the topmost and intermediate sheets, said bottommost and intermediate sheets being in engagement with a layer of heat dissipating material therebetween, said layer of material being supported by said bottom section in spaced relationship thereto so as to provide a reference base for supporting an article to be brazed in said space between said topmost and intermediate sheets, means for evacuating the space between the topmost and intermediate sheets, and sealing means between each of said closure members and its adjacent envelope sheet, whereby said closure members, top oven section and bottom oven section form an oven with the periphery of said sheets outside of the heat zone which is the interior of said oven.

8. A furnace in accordance with claim 7 including additional means in communication with the interior of the furnace for evacuating the space above the topmost envelope sheet and below the bottommost envelope sheet.

9. A furnace in accordance with claim 8 including a heat dissipating slab on the topmost envelope sheet, said last mentioned slab being substantially co-extensive with said layer of heat dissipating material.

10. A furnace in accordance with claim 7 including means within each of the closure members for cooling the portions of the closure members adjacent the sealing means.

11. A furnace in accordance with claim 7 in which each of said envelope sheets includes means for accommodating to thermal changes within said oven interior.

12. In a brazing furnace for brazing honeycomb panels comprising means defining a honeycomb panel receiving section, said means including first, second and third spaced impervious sheets superimposed over one another, means including a gasket seal releasably sealing the peripheries of said sheets, heating means operatively disposed for heating only said panel receiving section, the peripheries of said sheets being spaced from said heating means so as not to be heated thereby, a heat dissipating slab between said second and third sheets forming a reference base on which a honeycomb panel may be supported, and means including the flexibility of said first sheet for causing a pressure differential across said first sheet to firmly maintain a honeycomb panel between said first sheet and said second sheet against and supported by said heat dissipating slab.

13. In a brazing furnace in accordance with claim 12 wherein said means for causing a pressure differential includes a conduit extending through said gasket seal means in a plane between said first and second sheets, and a vacuum pump connected to an end of said conduit which is remote from said gasket seal means.

References Cited in the file of this patent

UNITED STATES PATENTS

| | | |
|---|---|---|
| 1,463,338 | Olsen | July 31, 1923 |
| 1,876,401 | Chatfield | Sept. 6, 1932 |
| 2,175,922 | Scott | Oct. 10, 1939 |
| 2,224,404 | Machlet | Dec. 10, 1940 |
| 2,421,482 | Crocker | June 3, 1947 |
| 2,468,456 | Ness | Apr. 26, 1949 |
| 2,477,796 | Germany | Aug. 2, 1949 |
| 2,556,962 | Field | June 12, 1951 |
| 2,656,170 | Mann | Oct. 20, 1953 |
| 2,671,658 | Moore | Mar. 9, 1954 |
| 2,693,636 | Simpelaar | Nov. 9, 1954 |
| 2,736,400 | Gay et al. | Feb. 28, 1956 |
| 2,856,172 | Kautz | Oct. 14, 1958 |
| 2,899,192 | Fritz | Aug. 11, 1959 |
| 2,984,732 | Herbert | May 16, 1961 |
| 3,011,926 | Rowe | Dec. 5, 1961 |